United States Patent [19]

McAllister, Jr.

[11] Patent Number: 4,499,034
[45] Date of Patent: Feb. 12, 1985

[54] VORTEX-AUGMENTED COOLING TOWER-WINDMILL COMBINATION

[75] Inventor: John E. McAllister, Jr., Aiken, S.C.

[73] Assignee: The United States of America as represented by the United States Department of Energy, Washington, D.C.

[21] Appl. No.: 414,193

[22] Filed: Sep. 2, 1982

[51] Int. Cl.³ .............................................. B01F 3/04
[52] U.S. Cl. ........................ 261/109; 261/DIG. 11; 261/DIG. 77; 261/DIG. 87; 415/2 A; 290/44; 290/55
[58] Field of Search ............ 261/109, 79 A, DIG. 11, 261/DIG. 77, DIG. 87, 30; 415/2 R, 2 A; 290/44, 55; 165/DIG. 1

[56] References Cited

U.S. PATENT DOCUMENTS

| 757,800 | 4/1904 | Williams | 290/55 |
|---|---|---|---|
| 1,739,867 | 12/1929 | Seymour | 261/DIG. 11 |
| 3,608,873 | 9/1971 | Furlong | 261/DIG. 11 |
| 3,936,652 | 2/1976 | Levine | 261/DIG. 87 |
| 4,031,173 | 6/1977 | Rogers | 290/55 X |
| 4,070,131 | 1/1978 | Yen | 290/44 X |
| 4,157,368 | 6/1979 | Fernandes | 261/109 X |
| 4,164,256 | 8/1979 | Kelp | 261/109 X |

FOREIGN PATENT DOCUMENTS

| 3014971 | 10/1981 | Fed. Rep. of Germany | 290/55 |
|---|---|---|---|
| 2234540 | 1/1975 | France | 261/DIG. 77 |

Primary Examiner—Richard L. Chiesa
Attorney, Agent, or Firm—Allen F. Westerdahl

[57] ABSTRACT

A cooling tower for cooling large quantities of effluent water from a production facility by utilizing natural wind forces includes the use of a series of helically directed air inlet passages extending outwardly from the base of the tower to introduce air from any direction in a swirling vortical pattern while the force of the draft created in the tower makes it possible to place conventional power generating windmills in the air passages to provide power as a by-product.

11 Claims, 7 Drawing Figures

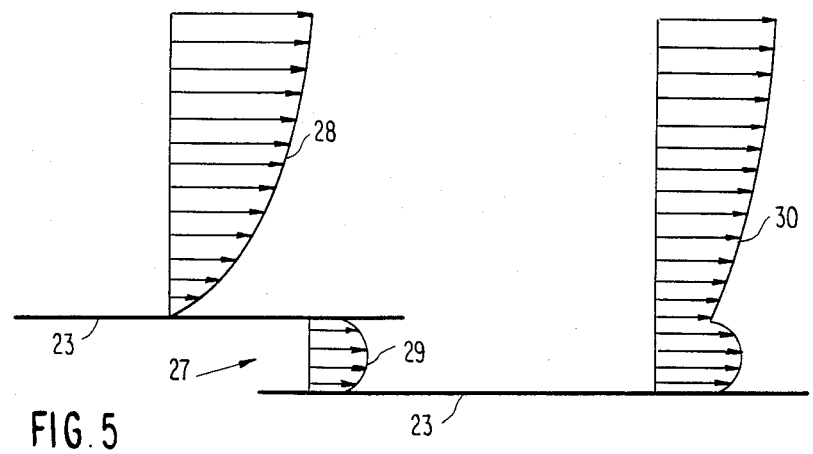
FIG. 5
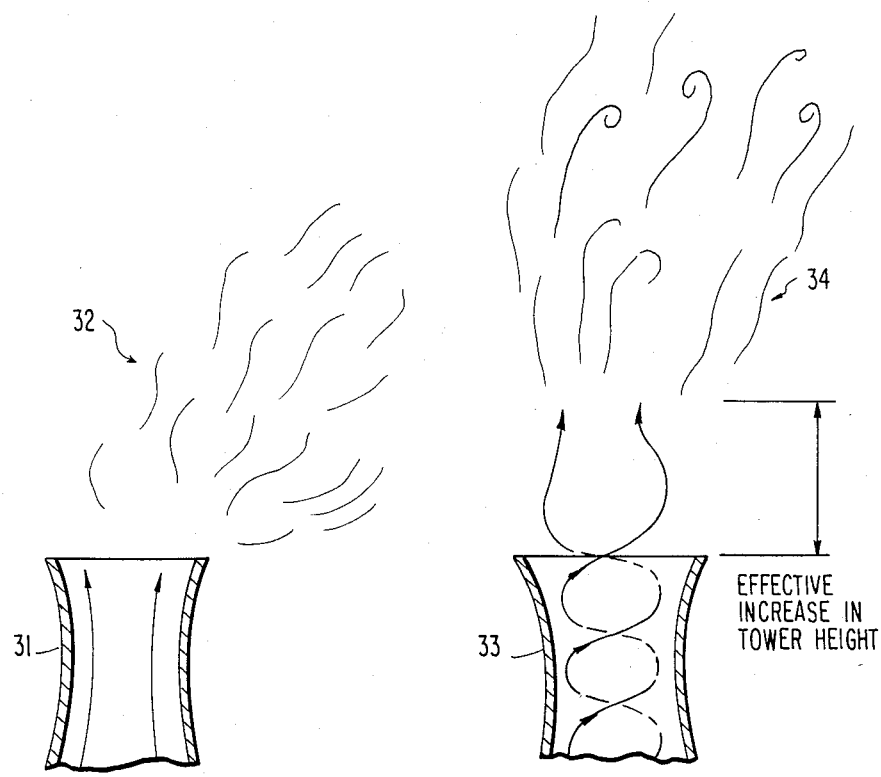
FIG. 6
NATURAL DRAFT
FIG. 7
VORTEX DRAFT
EFFECTIVE INCREASE IN TOWER HEIGHT

VORTEX-AUGMENTED COOLING TOWER-WINDMILL COMBINATION

The U.S. Government has rights in this invention pursuant to Contract No. DE-AC09-76SR00001 between the U.S. Department of Energy and E. I. du Pont de Nemours and Company, Inc. (41 CFR 9-9.109-6(i) (5) (ii) (B).

FIELD OF THE INVENTION

The present invention relates to cooling towers by means of which wind forces are harnessed to bring ambient air into intimate contact with effluent water discharged at high temperature from a production facility and, as an ancillary benefit, to generate power, to cooling of the effluent water being required to permit its return to the natural stream, or river, from which it was obtained without impairing the ecological balance.

BACKGROUND OF THE INVENTION

Towers of this type may be several hundred feet in height with a diameter at the base being somewhat greater than one-third the height of the tower. Effluent water is pumped into the interior of the tower at an intermediate level is thereby brought into contact with an upwardly flowing draft of atmospheric air developed by natural wind current which are introduced at the base of the tower.

Contact between the air and water in the tower is maintained in one of two ways. The tower may be filled with rock fragments or may include a lattice-work matrix through which the air current passes to evaporate and cool the water which is continually sprayed on the rock or matrix surfaces. Due to the restriction in the flow of air only a minimum of power can be generated by wind turbines placed in the air stream.

Generally, when the generation of power as an ancillary benefit is considered, an unimpeded air draft in the tower is required and water is supplied by nozzles arranged around the interior wall of the tower near the base to minimize the amount of water lost as evaporated vapor.

In one form of cooling tower of this type, a wind turbine using propellor blades rotating on a vertical axis was placed in the exit plane of the tower. However, it was found that the blades interferred with the tower's natural drafting ability especially when the velocity of the air draft at the exit plane was in the range of 12-15 ft/sec or less.

It has also been suggested to use a tower having a hyperbolic vertical wall configuration in which the horizontal cross-section converges upwardly from the base to an intermediate level and then diverges to the exit plane at the top, with the vertically rotating blades of the wind turbine located at the narrow throat portion to maximize the increased air velocity at that level since power is proportional to the air velocity cubed, and additional power should be obtained by the vortex core formed in the exhaust draft above the turbine. However, the reduction in throat diameter needed to increase the air velocity resulted in an excessive air flow pressure drop which reduced the air flow. The result was that a minimal increase in power output was accompanied by excessive costs in additional wind turbine support structures.

U.S. Pat. No. 4,031,173 issued to Paul Rogers discloses a tower having an arrangement of blade-like surfaces mounted on the exterior of the tower for rotation about the tower in a horizontal plane in response to wind movement. Each of the blades is adjustably mounted in a framework carried on rollers supported on a track that surrounds the tower. The complexity of this design would tend to make it commercially impractical.

U.S. Pat. No. 4,070,131, issued to James T. Yen discloses two forms of towers in which a vortex core air flow with a wind turbine rotating in a horizontal plane located at the base of the tower. In one form of the invention the tower wall consists of a series of narrow vertical vanes mounted for individual rotation under the control of a wind direction sensor for the purpose of introducing wind into the tower with a swirling movement regardless of the direction from which the wind is arriving.

In a modified form a single wind inlet includes a helical passage at the base of the tower to introduce air with a swirling motion and the entire tower and single air inlet are mounted on a rotary platform for movement, under control of a wind direction sensor, to place the inlet in correct position at all times. Nevertheless, the concept of building a tower several hundred feet tall and nearly as wide at its base with the walls consisting of automatically pivoted narrow air-directing vases or of building a solid-walled tower of that size and mounting it and its attendant air inlet and power generating mechanisms on a rotatable platform are not presently commercially appealing. It should also be mentioned that no specific provision for cooling water is disclosed in this patent.

BRIEF SUMMARY OF THE INVENTION

According to a paper by Karl H. Bergey, "The Lanchester—Betz Limit" published in the Journal of Energy, Vol. 3, No. 6, November-December 1979 pp. 382-384, the maximum possible power obtained from a windmill is calculated from:

$$P = \eta \frac{\rho A_w V_a^3}{2} \tag{1}$$

which can be written as $$P = \eta \frac{\dot{M}a\, V_a^2}{2} \tag{2}$$

where P is the power obtained
N is the windmill efficiency
Ma is the mass flow rate
Va is the air velocity Since typical windmills have similar efficiencies (theoretical maximum is 0.59) and large scale air density control is not practical, the controlling factor on windmill power is a combination of air velocity and windmill blade area. Increased power production results from increasing either the blade diameter or the air velocity. However, rotor stress considerations limit the blade diameter and maximum air velocity.

The theoretical maximum efficiency of 0.59 is valid for only those windmills which remove kinetic energy from the air stream. These windmills are typical of those found on rural farms. Recent research has increased windmill efficiency by recovering a portion of the air stream pressure energy which is far greater than the air stream kinetic energy. This research involves methods of reducing the windmill back pressure. The difference between inlet and output pressures is then converted into usable energy. For example, the pressure equivalent of a 30 mi/hr wind is only 0.016 psia. This pressure is over 60 times smaller than the available energy in a 1 psi inlet and outlet pressure difference.

A cooling tower is judged by its effectiveness in cooling a given water flow. Heat transfer consideration indicate this cooling to be a function of air flow, tower height to which the water is pumped, ambient air temperature and humidity, and the water path in the tower. Since ambient air conditions cannot be altered and water inside a cooling tower traditionally splashes around a beam-matrix-type fill material from its entry point to the ground, a given cooling capacity is dictated by tower size. The larger the tower diameter, the larger the air flow. Also, for a given tower diameter, the air flow is increased by increasing the tower height. The maximum air flow is determined by balancing the maximum theoretical draft, measured in inches of water, with the cooling tower air flow friction losses; the draft being determined by the equation $$\text{Draft} = H/5.2(1/v_{amb} - 1/v_{aE}) \quad (3)$$

where H is the cooling tower height
$v_{amb}$ is ambient air specific volume
$v_{aE}$ is the air specific volume at the cooling tower exit plane The specific volume diffference in Equation 3 are equivalent to the Boussinesq approximation discussed in H. Tennekes and J. L. Lumley's text "A First Course in Turbulence", MIT Press, Cambridge, Mass., 1972, p. 136, in which density differences are created by temperature differences.

A vortex flow pattern can enhance cooling tower effectiveness for two reasons. First, the vortex generates larger air velocities which increases the heat transfer between the ambient air and water. Second, the swirling motion of the vortex flow has a tendancy to maintain its flow pattern for some distance above the tower height, thereby increasing the theoretical draft in Equation 3. By maintaining this swirling motion, the tower plume does not develop as rapidly as for a typical natural draft tower.

The vortex has a tendency to maintain its swirling motion upon exiting the tower because of the Helmholtz vorticity concept as set out in I. G. Curries "Fundamental Mechanics of Fluids" McGraw-Hill, New York, 1974, pp. 46–48. These concepts state that vorticity is related to circulation, a conserved quantity, by $$\Gamma = \int_A \bar{\omega} \cdot \bar{n} ds$$

where
$\Gamma$ represents circulation
A is the area
$\bar{\omega}$ is the vorticity vector
n is the unit normal vector Since the flow's circulation upon leaving the cooling tower is fixed, the plume slowly develops because the flow vorticity resists atmospheric diffusive action. In the typical cooling tower there is no flow vorticity and the flow is less resistive to atmospheric diffusive action.

The effective increase in tower height resulting from a vortex flow pattern can also enhance windmill power production. This occurs because the increased effective tower height results in a larger air flow and air velocity through the tower. Equation 2 shows the relationship between these flow parameters and power production.

It is apparent that for the tower to be able to cool effectively and operate a windmill in the exit plane, the air flow exit velocity must be increased. To increase this velocity, the fill material in a typical cooling tower is not used and the water to be cooled is sprayed into the tower. Since the pressure drop for air moving upward past water droplets is less than the typical cooling tower in which air flows through the beam matrix-type fill material, greater air velocity and mass flow is possible for this type of water-air heat transfer.

The windmills are located around the tower base periphery for a combination of reasons. First, standard windmills can be used because the blades are perpendicular to the ground. Second, relatively simple installation is possible when compared to the windmill configuration in which turbines rotating about a vertical axis are placed in the tower itself. Third, the windmills are physically located to avoid interfering with the heat transfer processes between the water addition and ground levels. To obtain the desired cooling tower effectiveness, the water droplets need to drop from the water addition level to the ground. If horizontally rotating windmills are placed at the ground level in the plane of the tower wall the water droplets in the tower cross-sectional area would not be uniformly distributed and poor water cooling would result. Looking at Equation 3, poor water cooling results in a smaller theoretical tower draft which translates into a smaller tower air flow. Using Equation 2, the smaller flow results in smaller power generation.

To avoid this problem the windmills are located at a distance outwardly from the base of the tower and their exhausts are directed by means of horizontal passages to the tower base. These passages are desireable to prevent the wake of one windmill from interfering with the performance of adjacent windmills. This air flow path can be optimized to increase windmill power production by providing one or more additional outside air injection slots in the passages downstream from each of the windmills. This results in a reduced windmill exhaust pressure to provide increased power production.

By arranging the windmills about the entire periphery of the base of the tower with their air inlets facing outwardly it becomes unnecessary to mount the windmills or air inlets on rotating structures with the concomitant necessity for providing air direction sensors and controlled power devices for continually shifting the air inlets to conform to changes in wind direction. Considering the array of air inlets as a whole they constitute an omnidirectional air inlet for the cooling tower.

By further arranging the air passages in a symmetrical pattern in which each passage introduces the exhaust air from a windmill into the base of the tower at an angle with respect to a tower radius, a swirling action is imparted which develops a vortical upward flow in the tower.

It is therefore an object of the invention to provide a water cooling tower having an unobstructed interior with an omnidirectional fixed air inlet means at the base.

Another object is to provide a water cooling tower which includes wind turbine power generating means located outside of the tower itself to avoid interference with either the flow of air in the tower or the interactive pattern of contact between water to be cooled and the cooling air.

A further object is to provide a cooling tower having an unobstructed vortex air flow pattern in the tower to increase the tower efficiency and including wind turbine power generating means operated by the air flow thus produced.

Still another object is to provide tower means for confining and upwardly directing currents of atmospheric air by means of which effluent water may be cooled and power may be generated by conventional windmills.

A still further object is to provide air inlet means for introducing atmospheric air into the base of a water cooling tower by means of symmetrically arranged horizontally directed air passages in which conventional windmills are installed, the efficiency of the windmills being increased by the introduction of additional atmospheric air at points downstream of the windmills.

Yet another object is to provide a wind operated water cooling and power generating tower having air inlet means at its base arranged to introduce atmospheric air into the base in a helical direction to generate a solid core vortex flow air discharge path in the tower.

BRIEF DESCRIPTION OF THE DRAWINGS

In the drawings.

FIG. 5 is a graphical representation of the effect of introducing additional air into an air passage;

FIG. 6 is a schematic representation of action of the plume rising from the outlet of a tower operating under natural draft, and;

FIG. 7 is a schematic representation of the effects of a vortex draft as it leaves the exit plane of a cooling tower.

DETAILED DESCRIPTION OF THE INVENTION

Figure 1:
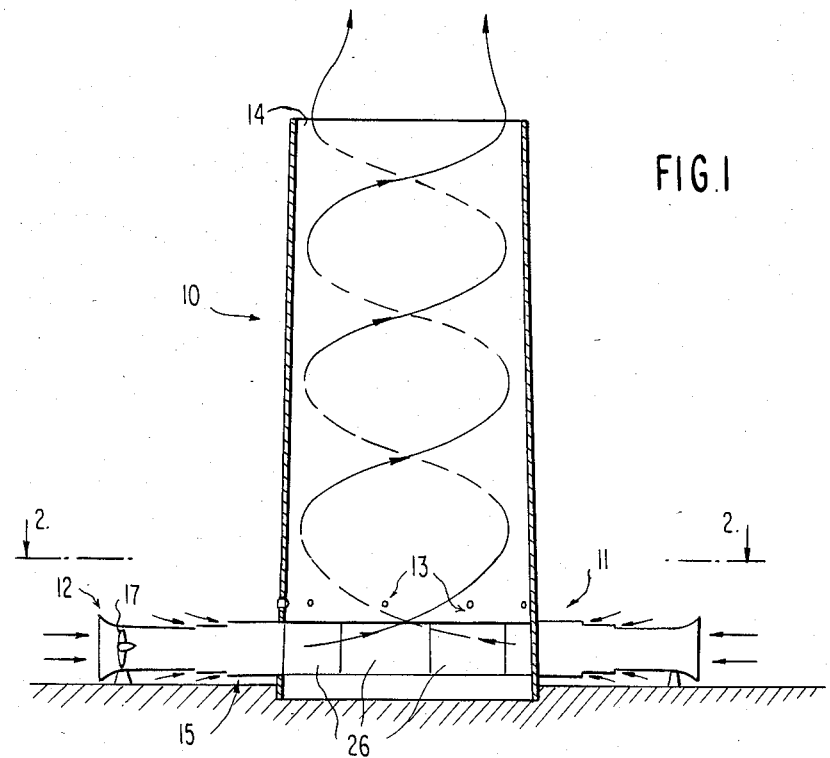
FIG. 1 is a cross-sectional elevation, taken on the line 1—1 of FIG. 2, of a preferred form of water cooling and power generating tower in accordance with this invention.

In the drawings, a large vertical cooling tower is indicated generally by numeral 10, said tower being provided with omnidirectional atmospheric air inlet means at its base, indicated generally by numeral 11, said air inlet means including wind turbine actuated power generating means, indicated generally by numeral 12. Appropriate nozzle means, indicated generally by numeral 13, is provided for introducing water into the interior of the tower to be cooled by the flow of air from inlet means 11 upwardly to the outlet opening 14 at the top of the tower.

The omnidirectional air inlet means 11 preferably comprises a series of helically directed horizontally extending similar passages 15 disposed about the entire exterior periphery at the base of tower 10. The inlet ends 16 of each of the passages are located radially outwardly of the tower, so that at any given time these inlets will collect a flow of atmospheric air, regardless of the wind direction.

Within each of the passages 15 a wind operated power generating means, such as a windmill 17 is mounted for customary rotation about a horizontal axis and, in order to confine the air flow for maximum effectiveness in driving the windmill, the inlet end 16 is preferably circular in outline and may be inwardly constricted, as at 18, to provide a venturi effect. The hub of the windmill may include means for generating electrical power such as a generator, or alternator 19, mounted in the passage by means of two or more radially extending arms 20.

Due to the fact that the temperature of the air is increased as a result of work performed in turning the windmill the cross-sectional area of the passage 15 is progressively increased in the direction down stream from windmill 17 so as not to impede the flow or create back pressure. In addition it may be desirable to introduce additional outside air into the passage to overcome boundary layer effects. This additional air could be introduced by the provision of one or more circumferentially extending slots in the circular wall of passage 15 but as a practical matter, and in order to provide a circumferentially uniform air flow around the base of the tower each passage 15 merges along its intermediate portion 21 from a circular cross-section into a rectangular cross-section having horizontal upper and lower wall 22, and 23 and vertical side walls 24, the terminal ends of the side wall 24 of adjacent passages having common vertical margins 25 which define with the terminal margins of upper and lower walls 22 and 23 the outlet end 26 of each passage.

In view of the complexity involved in attempting to provide additional air openings extending circumferentially around the circular portion of each of the passages 15 it may be desirable to maximize the width to height ratio of the rectangular outlets 26 and to provide one or more transverse vertically oriented slotted openings 27 only in the upper and lower walls 22 and 23 in the rectangular portion of each passage downstream from the windmill 17.

The effectiveness of providing the additional air inlets 27 is illustrated in FIG. 5 wherein the envelope curve 28 defined by the horizontal arrows at the left indicate relative unit air velocities existing in a vertically direction upwardly from the bottom wall 23 in a passage 15 upstream from a slot 27, the envelope curve 29 denotes relative unit air velocities in the air entering the slot and the combined curve 30 shows the extent to which air velocities across the height of the passage may become equilized by the addition of air. In a sense it can be said that the added air acts as a lubricant at the interface between the upper and lower boundaries of the main body of flowing air and its confining walls.

Figure 2:
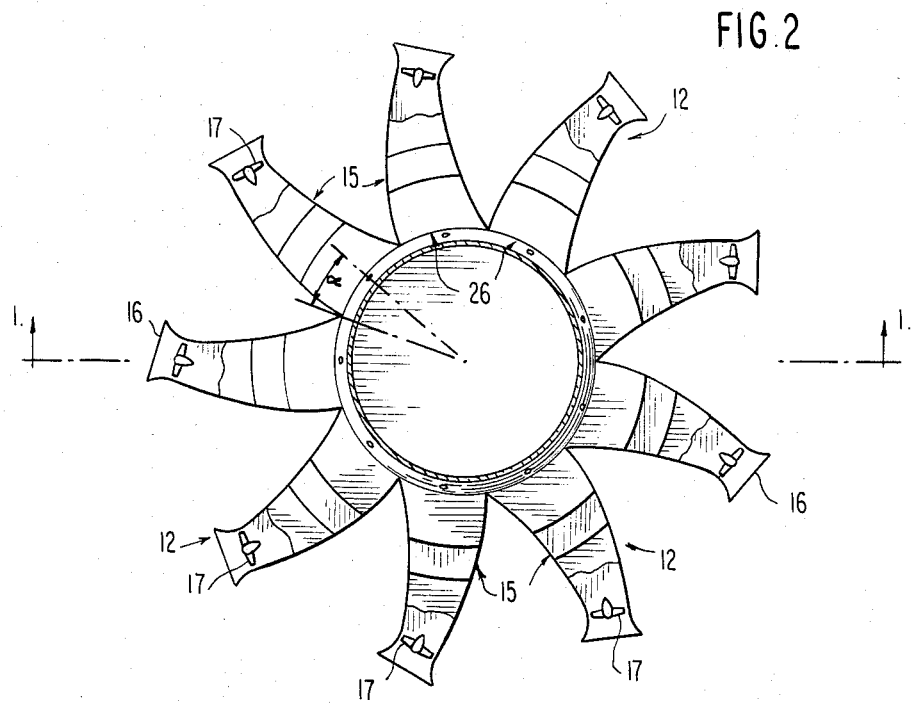
FIG. 2 is a horizontal cross-section taken on the line 2—2 of FIG. 1.

From an observation of FIG. 2 it can be seen that, it there are nine air inlet passages disposed about the base of the tower 10, regardless of the direction from which the wind is blowing, there will always be at least three, and possibly as many as four, of the inlets 16 which are positioned to capture portions of the blowing air and to rotate the windmills 12 positioned directly downstream from those inlets to generate electricity in varying amounts by the devices 18 connected to them. However, in operation, the incoming air flow enters the tower from all sides, regardless of the ambient wind direction. This is because the density difference between the warm air inside the tower and the cooler air outside the tower results in a pressure difference which causes the air to enter from all sides. Thus all of the wind turbines can generate power at the same time.

As the currents of air in each passage moves downstream the expanding cross-sections of the passages allows the air to expand, thus reducing back pressure and increasing the efficiency of the windmills. Efficiency is further improved by the provision of the additional air inlets 27 which allows air to be drawn in, not only as a result of external wind pressure but due to the suction created by the internal flow of air whereby boundary layer effects are controlled and a more nearly equalized pressure across the entire cross-section of the passages is obtained. To accommodate the increased volume of air due to expansion and the addition of outside air it is calculated that the cross-sectional area of each of the outlets 26 should be approximately three times that of areas of the inlets 16 in order to satisfactorily reduce back pressure of the wind turbine devices 12.

By arranging each of the air passages 12 to direct air in symmetrical helical paths, the currents of air leaving the respective outlets 26 join together at the base of the tower 10 to generate a single helical upwardly directed flow of air within the tower, as indicated by the arrows in FIG. 1. Studies have further shown that the horizontal orientation of the air passages should be such that the body of air entering from each of the passages should be directed at an angle $\alpha$ no greater than 30° with respect to a radius of the tower, as can be seen in FIG. 2. If the air is directed into the tower by the passages at angles greater than 30° there will be increasing tendency for the air from each of the passages 15 to create its own individual vortical pattern which, of course, will oppose and conflict with those generated by the other passages rather than to blend in additively with the flow from the other passages to generate a swirling pattern encompassing the entire interior of the tower.

The benefit of this homogeneous vortical upward air flow pattern can be seen by a comparison between FIGS. 6 and 7 in which FIG. 6 illustrates the fact that when the flow of air in a tower 31 moves upwardly in an uncontrolled natural direction the plume 32 of air exiting from the top of the tower is blown to the right by a wind from the left as soon as the plume leaves the tower. On the other hand, in the tower 33 of FIG. 7 in which the air flows upwardly in the tower in a controlled vortical pattern it continues upwardly from the top of the tower for a certain distance, indicated by arrow 34, undisturbed by the wind flowing from the left, before the plume 34 is dissipated by the wind. By analogy the forces of the upward drafts disclosed in FIGS. 6 and 7 resemble the behaviour of a ball fired from an antique cannon as compared to a projectile shot from a rifled gun. The result is to increase the effective height of tower 33 beyond its actual physical elevation and since the draft in the tower is a function of height the benefit of increased efficiency in the generation of power by wind turbine devices 12 is increased without the expense of additional construction costs.

Further in this connection it should be noted that other configurations of surfaces of revolution have been, and may be, employed in the construction of applicants' tower 10. These include cylindrical walls and walls defined by parabolic or hyperbolic curves in which the walls either continuously converge, or converge and diverge, in an upward direction but a preferred construction involves the use of a tower having an upwardly converging conical wall.

Figure 3:
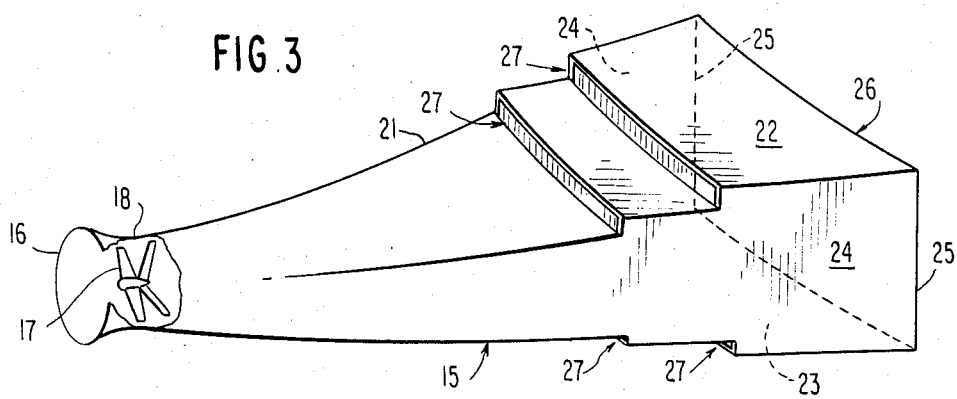
FIG. 3 is a perspective view, on a greatly enlarged scale, of one of the air inlet passages.
Figure 4:
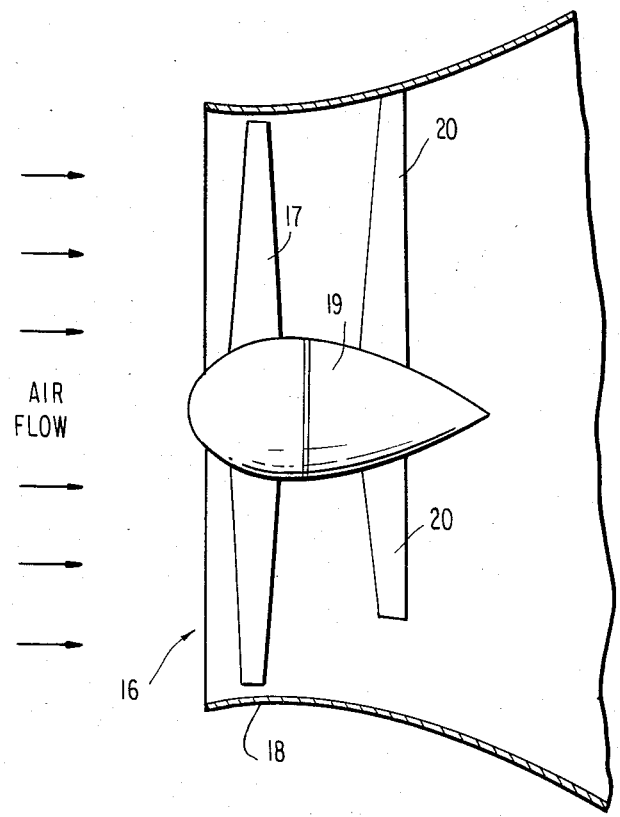
FIG. 4 is a fragmentary longitudinal cross-section, on a still more enlarged scale, of the inlet end of an air passage, showing the mounting of a wind turbine.

A proposed construction would consist of a tower in the form of a frustum of a cone having an overall height of 300 feet from the ground to the exit plane, with a base diameter of 140 feet and of 130 feet at the exit plane. Nine windmills with 24 foot diameter blades were placed around the tower base. Two percent of the available 28,000 lbm/sec air flow was reserved for boundary layer control (see FIG. 3). The windmill rotor air velocities were calculated to be 85 ft/sec and the air velocity at the entrance to the tower was 28.4 ft/sec. The passages were oriented with respect to the tower such that the entering air velocity components were: $w_i = 5$ ft/sec, $v_i = 7.3$ ft/sec, and $u_i = -27$ ft/sec (minus sign denotes radial inflow). The augmented air windmill efficiency was conservatively taken as 1.186 or twice the theoretical efficiency of windmills which remove only kinetic energy from the air. It is possible that diffuser augmentation efficiencies of 2.7 to 4.0, depending on centerbody design, are possible.

The effluent water was sprayed into the tower at a level of 23 feet above the ground in droplet sizes of 0.05 inch. Larger drop sizes require that they be introduced at greater heights which are uneconomical for pumping costs, while smaller droplets tend to be carried upwardly with the air flow.

Calculations indicate that an exit plane axial velocity of approximately 40 ft/sec for the cone-shaped tower is obtained. For the maximum air flow of 28,000 lbm/sec, the 40 ft/sec axial axit velocity indicated an approximate viscous vortex core of 60 ft diameter. With no vortex, conservation of mass indicated if the entire exit plane area was available for flow the exit axial velocity would be 31.7 ft/sec. The difference in axial exit velocities for the vortex and non-vortex cases would suggest a 26% increase for the vortex case.

Having disclosed one form in which the invention may be practical it will be apparent that modifications and improvements may be made which would fall within the scope of the annexed claims.

What is claimed is:

1. A vertical cooling tower for cooling water and generating power from a flow of air through the tower, said tower being defined generally by a surface of revolution and having fixed omnidirectional air inlet means at the lower end for introducing atmospheric air into the tower in a vortical flow pattern regardless of wind direction, the upper end of the tower being open to discharge said introduced air upwardly in a vortex draft pattern, means to introduce water to be cooled in the interior of the tower and wind turbine means disposed in said air inlet means for generating power;

said fixed omnidirectional air inlet means comprising a plurality of passages, each passage having a first portion located adjacent to the wind turbine means and a second portion located adjacent to the outlet end;

each of said plurality of passages including additional air inlet means downstream of said wind turbine means to reduce boundary layer effects;

the cross-sectional area of each of said plurality of passages increasing progressively from said first portion of the passage adjacent to the wind turbine means to said second portion adjacent to the outlet end;

the configuration of each said passage adjacent the wind turbine means being circular for closely encircling a rotating element of the wind turbine means, said cross-sectional configuration progressively merging into a rectangular outline terminating at the intersection with a lower end of the surface of revolution defining said tower;

said additional air inlet means comprising an elongated horizontal opening defined on one side by a terminal downstream margin of a horizontal wall of each of said plurality of passages, the opposite side of the opening being defined by the upstream terminal margin of a succeeding horizontal wall of the passage means;

the cross-sectional configuration of each of said plurality of passages being rectangular from at least said additional air inlet means to the outlet end.

2. A vertical cooling tower according to claim 1 wherein said rotating element of said wind turbine means is rotatable about a horizontal axis and is disposed in said omnidirectional air inlet means.

3. A vertical cooling tower according to claim 1, wherein said omnidirectional air inlet means comprises a plurality of helically directed passage means encircling the tower, the inlet end of each of the passage means being spaced radially outwardly from the exterior of the tower.

4. A vertical cooling tower according to claim 1, wherein said wind turbine means includes a set of propeller blades mounted on a shaft means in each of said passages for rotation about a horizontal axis.

5. A vertical cooling tower according to claim 4 wherein said shaft means in at least one of said passages includes an electrical generating means.

6. An apparatus for cooling water and generating power from a flow of air through the tower, comprising:
   a vertical cooling tower having a top portion and a bottom portion, and which is adapted for allowing generally free passage of air therethrough from said bottom portion to said top portion; said top portion being open;
   said cooling tower having an interior enclosed by an interior wall surface which is generally a surface of revolution;
   said bottom portion of said cooling tower having a plurality of openings therethrough adapted to admit air into said tower, and a plurality of ducts connected adjacent respective ones of said plurality of openings;
   each of said plurality of ducts having an inlet end, an outlet end; and a neck between said inlet end and said outlet end;
   each of said plurality of ducts being curved in a generally horizontal plane and being connected to said bottom portion of said cooling tower to direct air entering said plurality of openings at a predetermined angle to said interior wall surface for causing vortical air flow within said cooling tower;
   a plurality of wind turbines located within said neck of each of said plurality of ducts, said plurality of wind turbines each being adapted to produce output power in response to air flow through said neck;
   said top portion of said cooling tower being adapted to upwardly discharge air in a vortex draft so as to increase the effective height thereof;
   each of said plurality of ducts being elongated and the cross-sectional area of each duct increases progressively from said neck to said outlet end;
   each duct having an internal, generally circular, perimeter closely encircling said wind turbine at said neck, the internal perimeter progressively merging from said neck to said outlet end into a generally rectangular shape;
   and further comprising at least one additional air inlet in each of said plurality of ducts, each of said additional air inlets being an elongated opening defined on one side by the terminal downstream margin of a horizontal wall of the respective said ducts, the opposite side of the opening being defined by the upstream terminal margin of a succeeding horizontal wall of the respective said duct;
   the internal perimeter of each respective said duct being rectangular from at least said additional air inlet to the respective outlet end;
   a means for introducing free water droplets into said interior of said cooling tower, so as to transfer heat from the droplets to air flowing upward in said cooling tower;
   whereby air moving upward through said cooling tower draws air into respective ones of said inlet ends of said ducts, each of said plurality of wind turbines being driven by the inlet air flow, each duct directing air into said cooling tower at said predetermined angle thereby forming vortical air flow with said cooling tower; the vortical air flow exiting said top portion of said cooling tower so as to increase the apparent cooling tower height which increases the draft upword enabling greater extraction of power from the air flow by said plurality of wind turbines.

7. An apparatus as claimed in claim 6, wherein said plurality of wind turbines are evenly spatially distributed in a generally horizontal plane about a periphery of said cooling tower such that each respective inlet end of each of said plurality of ducts faces in a different direction;
   whereby vortical air flow results in said cooling tower regardless of the direction of wind.

8. An apparatus as claimed in claim 7, wherein said cooling tower is cylindrical.

9. An apparatus as claimed in claim 6, wherein said predetermined angle is 30 degrees;
   whereby a vortical air flow pattern in said cooling tower results, without formation of a plurality of individual vortical flows in said cooling tower from each of said ducts.

10. An apparatus as claimed in claim 6, wherein said cooling tower is cylindrical.

11. An apparatus as claimed in claim 6, wherein there are nine ducts.

* * * * *